US009226142B2

(12) United States Patent
Fukuda

(10) Patent No.: US 9,226,142 B2
(45) Date of Patent: Dec. 29, 2015

(54) MOBILE COMMUNICATION SYSTEM, COMMUNICATION CONTROL METHOD, AND RADIO BASE STATION

(75) Inventor: Isamu Fukuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 753 days.

(21) Appl. No.: 13/238,222

(22) Filed: Sep. 21, 2011

(65) Prior Publication Data

US 2012/0082314 A1 Apr. 5, 2012

(30) Foreign Application Priority Data

Oct. 1, 2010 (JP) .................................. 2010-223514

(51) Int. Cl.
*H04L 9/00* (2006.01)
*H04W 12/04* (2009.01)
*H04L 29/06* (2006.01)
*H04W 12/02* (2009.01)
(Continued)

(52) U.S. Cl.
CPC ............. *H04W 12/04* (2013.01); *H04L 63/061* (2013.01); *H04L 63/0428* (2013.01); *H04W 12/02* (2013.01); *H04W 36/0038* (2013.01); *H04W 36/08* (2013.01)

(58) Field of Classification Search
CPC ....... H04L 63/00; H04L 63/04; H04L 63/061; H04L 63/0428; H04L 63/0435; H04L 9/00
USPC ............. 380/255, 270, 277; 713/171; 726/13, 726/26, 29
See application file for complete search history.

(56) References Cited

U.S. PATENT DOCUMENTS 7,380,124 B1 * 5/2008 Mizell et al. .................. 713/171
7,792,527 B2 9/2010 Wu et al.
(Continued)

FOREIGN PATENT DOCUMENTS

JP 2004-166270 6/2004
JP 2009-60156 A 3/2009
(Continued)

OTHER PUBLICATIONS

Ludwig, Optimizing the End-to-End Performance of Reliable Flows Over Wireless Links, 2002, Kluwer Academic Publishers, pp. 289-299.*

(Continued)

*Primary Examiner* — Luu Pham
*Assistant Examiner* — Jenise Jackson
(74) *Attorney, Agent, or Firm* — Fujitsu Patent Center

(57) ABSTRACT

A system includes: a first radio base station including: a first processor which performs processes to transmit and receive a first encryption key, and an first interface which transmits or receives the encapsulated packet, the second radio base station includes: a second interface which transmits or receives the encapsulated packet; and a second processor which encrypts or decrypts the packet with the first encryption key, the host node includes: a third processor which encrypts or decrypts the packet, and during processing of a handover of the mobile station, the host node transmits the packet encrypted with the first encryption key to the first radio base station, the first radio base station transmits the packet to the second radio base station by the tunneling, and the second radio base station decapsulates the packet, decrypts the packet with the first encryption key, and then transmits the packet to the mobile station.

12 Claims, 18 Drawing Sheets

(51) Int. Cl.
*H04W 36/00* (2009.01)
*H04W 36/08* (2009.01)

(56) References Cited

U.S. PATENT DOCUMENTS

| | | | |
|---|---|---|---|
| 7,855,990 B2* | 12/2010 | Aoki | 370/331 |
| 2002/0068584 A1* | 6/2002 | Gage et al. | 455/456 |
| 2007/0218903 A1* | 9/2007 | Grech | 455/436 |
| 2008/0125163 A1* | 5/2008 | Chi et al. | 455/550.1 |
| 2009/0016337 A1* | 1/2009 | Jorgensen et al. | 370/389 |
| 2009/0124259 A1* | 5/2009 | Attar et al. | 455/436 |
| 2009/0136036 A1* | 5/2009 | Okada | 380/272 |
| 2009/0172391 A1* | 7/2009 | Kasapidis | 713/156 |
| 2010/0172326 A1* | 7/2010 | Kim et al. | 370/331 |
| 2010/0232503 A1* | 9/2010 | Morimoto et al. | 375/240.13 |
| 2011/0002466 A1* | 1/2011 | Kwak et al. | 380/272 |
| 2011/0044279 A1* | 2/2011 | Johansson et al. | 370/329 |
| 2012/0082314 A1* | 4/2012 | Fukuda | 380/270 |

FOREIGN PATENT DOCUMENTS

| | | |
|---|---|---|
| JP | 2009-206815 | 9/2009 |
| WO | 2009/105249 A1 | 8/2009 |

OTHER PUBLICATIONS

Hu et al, Ariadne: A On-Demand Routing Protocol for Ad Hoc Networks, 2005, Springer Science, pp. 22-38.*
Japanese Office Action of Japanese Patent Application No. 2010-223514 dated Feb. 25, 2014 with Partial English Translation, 5 pages.

* cited by examiner

FIG. 12

| | |
|---|---|
| IP ADDRESSES (eNB 100a TO eNB 100b) PROTOCOLS, ETC. | IP HEADER (IP ENCAPSULATION) |
| IP ADDRESSES (SERVING GW200 TO eNB 100a) PROTOCOLS, ETC. | IP HEADER (ESP TUNNEL) |
| SPI | ESP HEADER |
| SEQUENCE NUMBER | |
| IP ADDRESSES (SERVING GW200 TO eNB 100a) PROTOCOLS, ETC. | IP HEADER (ESP INNER) |
| Type/Code, ETC. | UDP HEADER |
| MESSAGE TYPE | GTP HEADER |
| TEID | |
| SEQUENCE NUMBER | |
| IP ADDRESSES (OPPOSING UE, APPLICATION SERVER OR THE LIKE TO UE 300) PROTOCOLS, ETC. | IP HEADER (USER SIGNAL) |
| PAYLOAD | PAYLOAD (USER SIGNAL) |
| NEXT HEADER PROTOCOL, ETC. | ESP TRAILER |
| ICV | |

ENCRYPTED PARTS (from IP HEADER (ESP INNER) through ESP TRAILER)

FIG. 13

| | |
|---|---|
| IP ADDRESSES<br>(SERVING GW200 TO eNB 100a)<br>PROTOCOLS, ETC. | IP HEADER<br>(ESP INNER) |
| Type/Code, ETC. | UDP HEADER |
| MESSAGE TYPE | GTP HEADER |
| TEID | |
| SEQUENCE NUMBER | |
| IP ADDRESSES<br>(OPPOSING UE, APPLICATION SERVER OR<br>THE LIKE TO UE 300)<br>PROTOCOLS, ETC. | IP HEADER<br>(USER SIGNAL) |
| PAYLOAD | PAYLOAD<br>(USER SIGNAL) |

FIG. 14

| RLC RELATED INFORMATION | RLC HEADER |
| --- | --- |
| PDCP RELATED INFORMATION | PDCP HEADER |
| IP ADDRESSES<br>(OPPOSING UE, APPLICATION SERVER OR THE LIKE TO UE)<br>PROTOCOLS, ETC. | IP HEADER<br>(USER SIGNAL) |
| PAYLOAD | PAYLOAD<br>(USER SIGNAL) |

FIG. 15

| RLC RELATED INFORMATION | RLC HEADER |
|---|---|
| PDCP RELATED INFORMATION | PDCP HEADER |
| IP ADDRESSES (OPPOSING UE, APPLICATION SERVER OR THE LIKE TO UE) PROTOCOLS, ETC. | IP HEADER (USER SIGNAL) |
| PAYLOAD | PAYLOAD (USER SIGNAL) |

FIG. 16

| | |
|---|---|
| IP ADDRESSES<br>(eNB 100b TO SERVING GW200)<br>PROTOCOLS, ETC. | IP HEADER<br>(ESP INNER) |
| Type/Code, ETC. | UDP HEADER |
| MESSAGE TYPE | GTP HEADER |
| TEID | |
| SEQUENCE NUMBER | |
| IP ADDRESSES<br>(OPPOSING UE, APPLICATION SERVER OR<br>THE LIKE TO UE)<br>PROTOCOLS, ETC. | IP HEADER<br>(USER SIGNAL) |
| PAYLOAD | PAYLOAD<br>(USER SIGNAL) |

FIG. 17

| | |
|---|---|
| IP ADDRESSES (eNB 100b TO eNB 100a) PROTOCOLS, ETC. | IP HEADER (IP ENCAPSULATION) |
| IP ADDRESSES (eNB 100a TO SERVING GW200) PROTOCOLS, ETC. | IP HEADER (ESP TUNNEL) |
| SPI | ESP HEADER |
| SEQUENCE NUMBER | |
| IP ADDRESSES (eNB 100a TO SERVING GW200) PROTOCOLS, ETC. | IP HEADER (ESP INNER) |
| Type/Code, ETC. | UDP HEADER |
| MESSAGE TYPE | GTP HEADER |
| TEID | |
| SEQUENCE NUMBER | |
| IP ADDRESSES (OPPOSING UE, APPLICATION SERVER OR THE LIKE TO UE) PROTOCOLS, ETC. | IP HEADER (USER SIGNAL) |
| PAYLOAD | PAYLOAD (USER SIGNAL) |
| NEXT HEADER PROTOCOL, ETC. | ESP TRAILER |
| ICV | |

ENCRYPTED PARTS

FIG. 18

| | |
|---|---|
| IP ADDRESSES (SERVING GW200 TO eNB 100a) PROTOCOLS, ETC. | IP HEADER (ESP TUNNEL) |
| SPI | ESP HEADER |
| SEQUENCE NUMBER | |
| IP ADDRESSES (eNB 100a TO SERVING GW200) PROTOCOLS, ETC. | IP HEADER (ESP INNER) |
| Type/Code, ETC. | UDP HEADER |
| MESSAGE TYPE | GTP HEADER |
| TEID | |
| SEQUENCE NUMBER | |
| IP ADDRESSES (OPPOSING UE, APPLICATION SERVER OR THE LIKE TO UE) PROTOCOLS, ETC. | IP HEADER (USER SIGNAL) |
| PAYLOAD | PAYLOAD (USER SIGNAL) |
| NEXT HEADER PROTOCOL, ETC. | ESP TRAILER |
| ICV | |

ENCRYPTED PARTS (from IP HEADER (ESP INNER) through ESP TRAILER)

MOBILE COMMUNICATION SYSTEM, COMMUNICATION CONTROL METHOD, AND RADIO BASE STATION

CROSS-REFERENCE TO RELATED APPLICATIONS

This application is based upon and claims the benefit of priority from the prior Japanese Patent Application No. 2010-223514 filed on Oct. 1, 2010, the entire contents of which are incorporated herein by reference.

FIELD

Embodiments of the present invention relate to a mobile communication system, a communication control method, and a radio base station for holding encryption secure communication.

BACKGROUND

In a mobile communication system that adopts, for example, the Long Term Evolution (LTE) standard, user data is transmitted via both a handover-source radio base station and a handover-target radio base station at a time of a mobile-station handover between the radio base stations. For example, in downlink communication of transmitting the user data from a core network to a mobile station, the handover-source radio base station transfers the user data transmitted from a host node such as a serving gateway (GW) to the handover-target radio base station. The handover-target radio base station transmits the transferred user data to the mobile station, thereby executing communication of the user data. Note that in uplink communication, the user data is transmitted via a route that is the reverse of that for the downlink communication. By transferring the user data between the radio base stations as stated above, it is possible to realize seamless switching of communication partners in a handover.

Furthermore, in the handover, the user data is protected by encryption using individual encryption keys in individual sections where user data communications are held so as to prevent eavesdropping or tampering of the user data. Specifically, the serving GW encrypts the user data to be transmitted to the mobile station with an encryption key and transmits the encrypted user data to the handover-source radio base station. The handover-source radio base station decrypts the received encrypted data, encrypts the decrypted data with another encryption key, and transfers the encrypted data to the handover-target radio base station. The handover-target radio base station decrypts the received encrypted data, encrypts the decrypted data with still another encryption key, and transmits the encrypted data to the mobile station. The mobile station decrypts the received user data, thereby acquiring the user data from the core network.

SUMMARY

According to an aspect of the invention, a mobile communication system includes: first and second radio base stations each transmitting or receiving a packet to or from each of a mobile station and a host node, wherein the first radio base station includes: a first processor which performs processes to transmit and receive a first encryption key to and from each of the host node and the second radio base station, the first encryption key being used to achieve encryption secure communication; and an first interface which transmits or receives the packet to or from the second radio base station by tunneling, the packet being encapsulated, the second radio base station includes: a second interface which transmits or receives the encapsulated packet to or from the first radio base station by the tunneling; and a second processor which encrypts or decrypts the packet with the first encryption key, the host node includes: a third processor which encrypts or decrypts the packet, and during processing of a handover of the mobile station from the first radio base station to the second radio base station, the host node transmits the packet encrypted with the first encryption key to the first radio base station, the first radio base station transmits the packet to the second radio base station by the tunneling, and the second radio base station decapsulates the packet, decrypts the packet with the first encryption key, and then transmits the packet to the mobile station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 12 illustrates an example of a packet transferred in downlink by tunneling via X2AP;

FIG. 13 illustrates an example of a GTPU packet for downlink transmission and decapsulated in the radio base station;

FIG. 14 illustrates an example of a PDCP packet for downlink transmission and generated in the radio base station;

FIG. 15 illustrates an example of a PDCP packet transmitted in uplink to the radio base station;

FIG. 16 illustrates an example of a GTPU packet for uplink transmission and generated in the radio base station;

FIG. 17 illustrates an example of a packet transferred in uplink by tunneling via X2AP; and FIG. 18 illustrates an example of an encrypted packet transmitted in uplink via S1AP.

DESCRIPTION OF EMBODIMENTS

Figure 1:
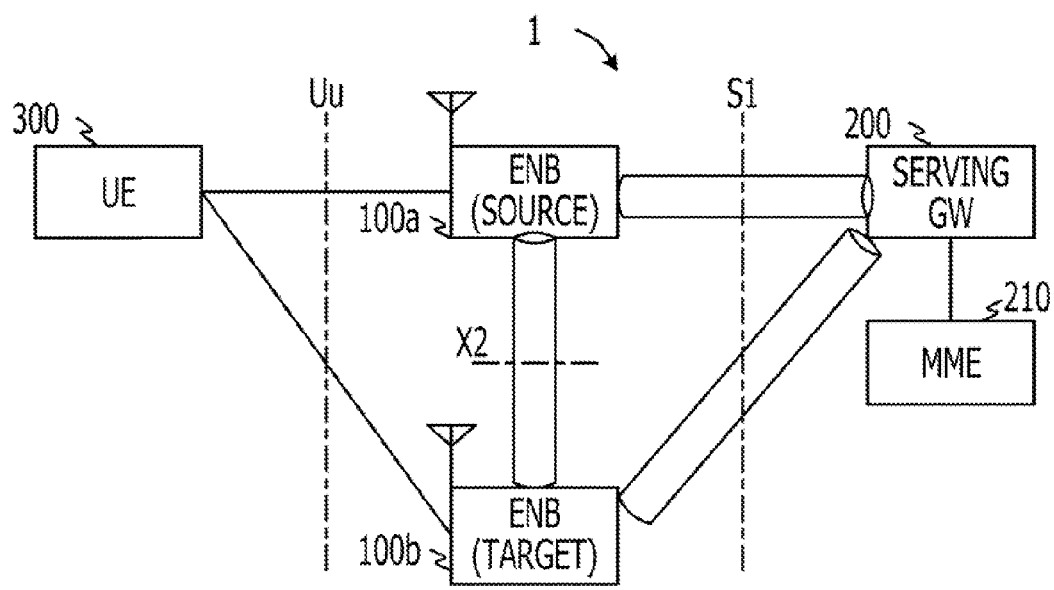
FIG. 1 illustrates an exemplary configuration of a mobile communication system.

Encryption secure communication held according to the LTE standard additionally requires encryption processing and decryption processing in the handover between the handover-source radio base station and the handover-target radio base station, as compared with that in a case where no handover is conducted. Loads resulting from communication delay and increased amount of processing due to the encryption processing and decryption processing between the radio base stations are possibly imposed on the encryption secure communication. To deal with the influence of the loads, devices having higher process performances are required, which disadvantageously increases the cost of mobile communication systems.

Furthermore, according to the techniques described in Japanese Laid-open Patent Application Publication No. 2009-206815, it is possible to dispense with the encryption processing in the handover-source radio base station and the decryption processing in the corresponding mobile station. On the other hand, it is necessary to exchange encryption keys in advance between the handover-source radio base station and the handover-target radio base station. Due to this, the techniques of Japanese Laid-open Patent Application publication No. 2009-206815 are disadvantageously, technically inapplicable to a system performing encryption and decryption for every node in such a system as the LTE-compliant system. The techniques of Japanese Laid-open Patent Application Publication No. 2009-206815 have another problem in that the user data cannot be sufficiently protected if data encryption is not performed.

Embodiments of the present invention have been achieved in view of the conventional problems. It is an object of the present invention to provide a mobile communication system, a communication control method, and a radio base station capable of realizing improved transmission efficiency by reducing processing delay without a reduction in the security level of encryption secure communication during a handover.

To attain the object, a mobile communication system according to an embodiment is a mobile communication system including first and second radio base stations each transmitting or receiving a packet to or from each of a mobile station and a host node.

The first radio base station includes: a first encryption-key exchange unit transmitting and receiving a first encryption key to and from each of the host node and the second radio base station, the first encryption key being used to achieve an encryption secure communication; and a first tunneling unit transmitting or receiving the packet to or from the second radio base station by tunneling, the packet being encapsulated.

The second radio base station includes: a second tunneling unit transmitting or receiving the encapsulated packet to or from the first radio base station by the tunneling; and a first encryption and decryption unit encrypting or decrypting the packet with the first encryption key.

The host node includes a second encryption and decryption unit encrypting or decrypting the packet.

During processing of a handover of the mobile station from the first radio base station to the second radio base station, (i) the host node transmits the packet encrypted with the first encryption key to the first radio base station, (ii) the first radio base station transmits the packet to the second radio base station by the tunneling, and (iii) the second radio base station decapsulates the packet, decrypts the packet with the first encryption key, and then transmits the packet to the mobile station.

With the configuration according to the embodiment, it is possible to perform high-speed handover processing at low cost while maintaining protection of the user data from eavesdropping or tampering. It is also possible to provide a low-cost, high-quality system while maintaining protection and compatibility for many handovers occurring at the same timing because of, for example, the movement of many mobile stations.

(1) Exemplary Configuration

An exemplary configuration of a mobile communication system 1 as an example of a mobile communication system according to an embodiment is described hereinafter with reference to the accompanying drawings. FIG. 1 illustrates the exemplary configuration of the mobile communication system 1.

The mobile communication system 1, which is a communication system based on the LTE standard, includes eNBs (eNodeB: evolved NodeB) 100*a* and 100*b* serving as radio base stations, respectively, and a serving GW 200 that is an example of a host node connected to the eNBs 100*a* and 100*b* and a core network. Each of the eNBs 100*a* and 100*b* forms a cell serving as a communication section by transmitting radio waves via an antenna, and communicates with a mobile terminal referred to as User Equipment (UE) 300 present in the cell. The serving GW 200 can be connected to a mobility management entity (MME) 210 managing mobility services for the UE 300 present in the cell of each of the eNBs 100*a* and 100*b*.

Each of the eNBs 100*a* and 100*b* is connected to an opposing device such as the serving GW 200 or the MME 210 by, for example, a dedicated wired line or a public IP network. For this reason, the encryption secure communication is held as IPsec communication to establish secure communication between the eNB 100*a* or 100*b* and the serving GW 200 or MME 210. The eNB 100*a* or 100*b* transmits or receives a control signal to or from the serving GW 200 on the basis of an S1 Application Protocol (S1AP) protocol. The S1AP is a control protocol for holding communication between a core network-side and the eNB 100*a* or 100*b* in the LTE-compliant mobile communication system 1. Note that the S1AP is encrypted in the mobile communication system 1 that adopts IPsec communication.

Furthermore, in the mobile communication system 1, the eNBs 100*a* and 100*b* transmit or receive control signals to or from each other on the basis of an X2 Application Protocol (X2AP). The X2AP is a control protocol for holding communication between the eNBs 100*a* and 100*b* in the LTE-compliant mobile communication system 1. Note that the X2AP is encrypted in the mobile communication system 1 that adopts IPsec communication. In the mobile communication system 1, at a time of a handover of the UE 300 between the eNBs 100*a* and 100*b*, the handover-source radio base station 100*a* or 100*b* transfers user data transmitted from the serving GW 200 to the handover-target radio base station 100*b* or 100*a* using the X2AP. In FIG. 1, the eNB 100*a* is indicated by eNB (source), that is, the eNB 100*a* serves as the handover-source radio base station, whereas the eNB 100*b* is indicated by eNB (target), that is, the eNB 100*b* serves as the handover-target radio base station. In the following description, the eNBs 100*a* and 100*b* are regarded as the handover-source radio base station and the handover-target radio base station, respectively according to FIG. 1 described above. Note that each of the eNBs 100*a* and 100*b* is often generally referred to as "eNB 100" if being described without distinction between the eNBs 100*a* and 100*b*.

In the mobile communication system 1, the eNB 100*a* or eNB 100*b* transmits or receives the user data or the like to or from the UE 300 communicating with the eNB 100*a* or eNB 100*b* using a Uu protocol. The Uu protocol is a control protocol for holding communication between the eNB 100*a* or eNB 100*b* and the UE 300 communicating with the eNB 100*a* or eNB 100*b* in the LTE-compliant mobile communication system 1.

Figure 2:
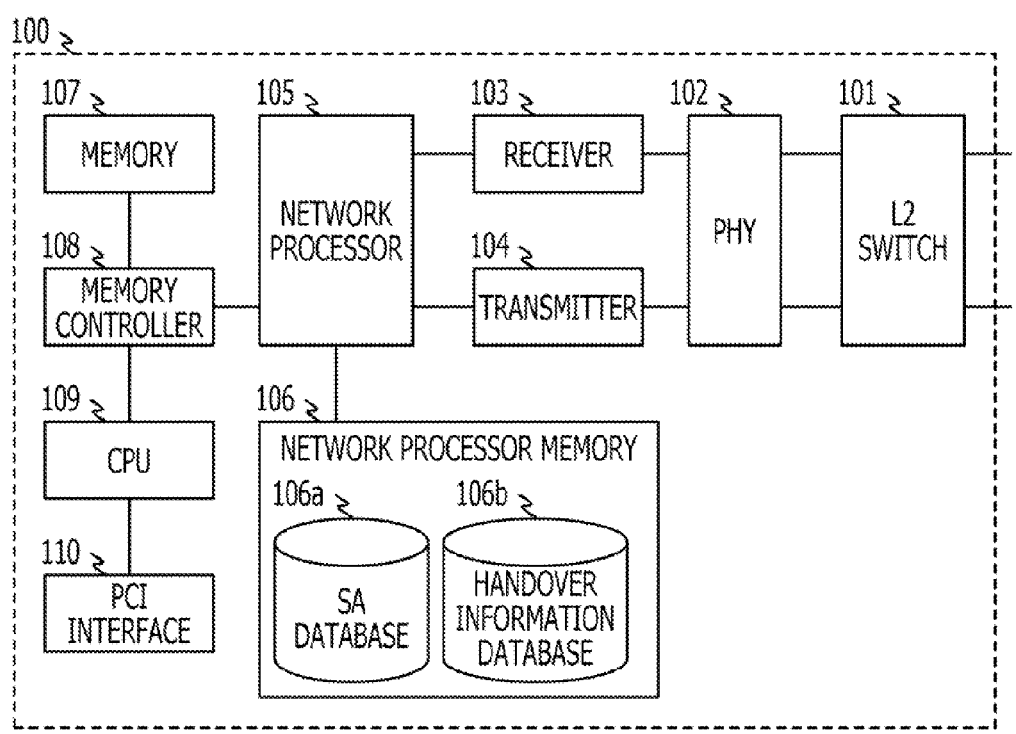
FIG. 2 illustrates a hardware configuration of a radio base station.

Referring to FIG. 2, a hardware configuration of the eNB 100 that is an example of a radio base station according to the embodiment is described. The eNB 100 includes an L2 switch 101, a communication interface (PHY) 102 for Ethernet®, a receiver 103, a transmitter 104, a network processor 105, a network processor memory 106, a memory 107, a memory controller 108, a central processing unit (CPU) 109, and a PCI interface 110, for example.

The L2 switch 101 is a bridge for Ethernet®-based data transmission, and transmits or receives data to or from the PHY 102. The receiver 103 is a device that controls a data-receive interface included in the PHY 102, and the transmitter 104 is a device that controls a data-transmit interface included in the PHY 102. The network processor 105 terminates the IPsec and various other protocols used in the communication with the serving GW 200 that is an example of an opposing device to the eNB 100, and controls data transmission and reception via the receiver 103 and the transmitter 104.

The network processor memory 106 is a storage device that stores various data for using the network processor 105 or that stores software or the like for actuating the network processor 105. The network processor memory 106 stores, for example, a Security Association (SA) database 106*a* and a handover information database 106*b*. The SA database 106*a* stores information such as an encryption key and a decryption key for the S1AP, those for the X2AP, those for handovers, and key-exchange negotiation results. The handover information database 106*b* stores information such as an IP address of the UE 300 relating to packets, a Tunnel Endpoint Identifier (TEID) of a tunnel in encryption secure communication, and handover sections.

The CPU 109 is a processor of a host that controls operations performed by the eNB 100. Data transmitted or received from the network processor 105 is communicated with an external processor (not shown) via the PCI interface 110 under control of the memory controller 108 and the CPU 109.

The serving GW 200 can be configured similarly to, for example, a well-known serving GW for constituent elements that are not particularly described herein and can be configured to include similar constituent elements to those of the eNB 100 stated above.

Figure 3:
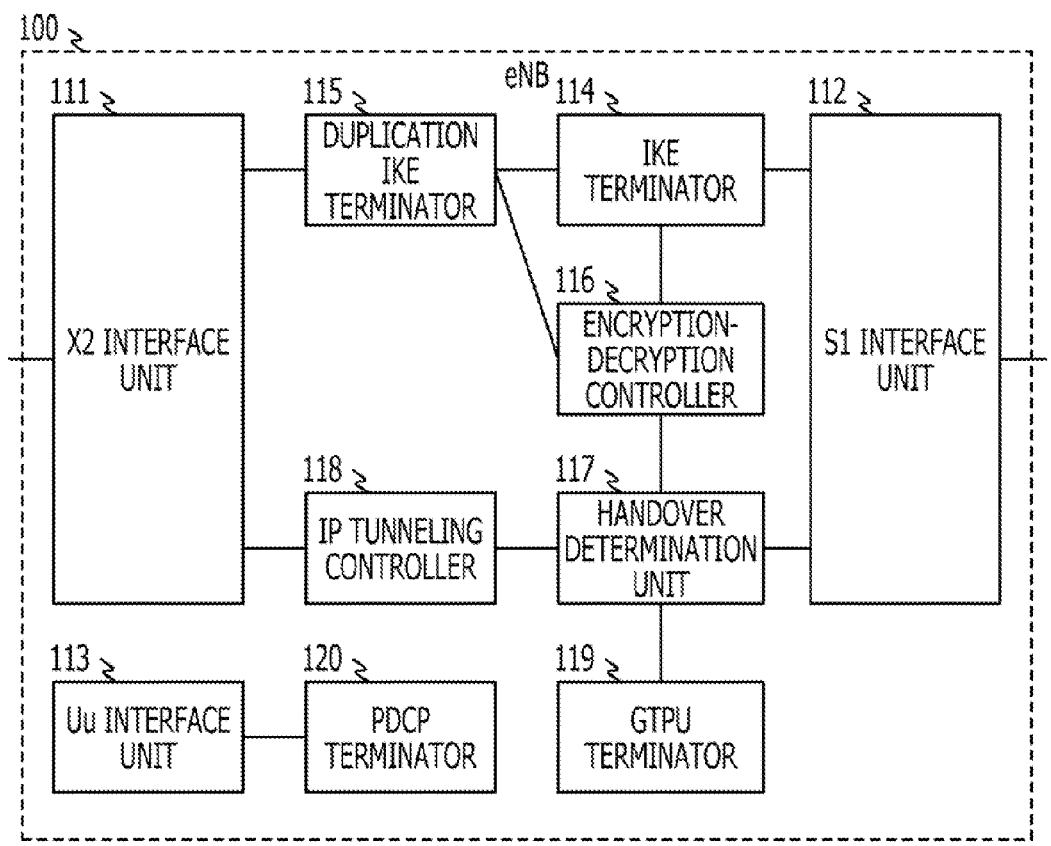
FIG. 3 illustrates exemplary functional units included in the radio base station.

Referring to FIG. 3, configurations of functional units, which hold an encryption secure communication of data using IPsec protocols, included in the network processor 105 of the eNB 100 are described.

As illustrated in FIG. 3, the network processor 105 of the eNB 100 includes an X2 interface unit 111, an S1 interface unit 112, a Uu interface unit 113, an IKE terminator 114, a duplication IKE terminator 115, an encryption-decryption controller 116, a handover determination unit 117, an IP tunneling controller 118, a GPRS Tunneling Protocol for User Plane (GTPU) terminator 119, and a Packet Data Convergence Protocol (PDCP) terminator 120.

The S1 interface unit 112 transmits or receives packets to or from the serving GW 200 (or the MME 210) serving as the host node using the S1AP. The X2 interface unit 111 transmits or receives packets to or from another eNB 100 using the X2AP. The Uu interface unit 113 transmits or receives packets to or from the UE 300.

The IKE terminator 114 is a unit that terminates the Internet Key Exchange (IKE) protocol used in IPsec communication. The IKE terminator 114 terminates a key exchange protocol belonging to an IPsec suit for communication via the S1 interface unit 112 and that via the X2 interface unit 111. Specifically, the IKE terminator 114 terminates an IKE packet received by the communication via the S1 interface unit 112 or that received by the communication via the X2 interface unit 111. The IKE terminator 114 also generates and exchanges encryption keys and decryption keys for the S1AP and X2AP. Furthermore, the IKE terminator 114 stores the encryption keys and decryption keys for the S1AP and X2AP in the SA database 106*a* included in the network processor memory 106.

The duplication IKE terminator 115 terminates the key exchange protocol in IPsec communication. Specifically, the duplication IKE terminator 115 negotiates key exchange in communication between the eNBs 100 (that is, communication using the X2AP) for duplication of a handover key. The duplication IKE terminator 115 also negotiates key exchange for the S1AP with the serving GW 200 that is the host node so as to generate an encryption key for uplink transmission of the user data in the handover of the UE 300. Further, the duplication IKE terminator 115 determines a negotiation result of the key exchange from an IKE packet for handover processing of the UE 300, and stores a duplication result of the encryption key for the handover processing in the SA database 106*a* included in the network processor memory 106.

The encryption-decryption controller 116 encrypts or decrypts a packet with the encryption key acquired by the IKE terminator 114 or the duplication IKE terminator 115 on the basis of, for example, the Encapsulating Security Payload (ESP) protocol. The encryption-decryption controller 116 decrypts a packet received by the S1 interface unit 112 by the following processing. The encryption-decryption controller 116 decrypts a control signal part of the received encrypted packet and decrypts the other parts of the encrypted packet on the basis of decrypted data or the like. Decryption operation performed by the encryption-decryption controller 16 is described more specifically later.

The handover determination unit 117 determines whether the UE 300 is in a handover state for the packet received by any one of the S1 interface unit 112, the X2 interface unit 111, and the Uu interface unit 113. According to a determination result relating to the handover state, the handover determination unit 117 transmits a command for encryption or decryption of the packet, IP tunneling transmission or conversion of a protocol for the packet into a GTPU protocol.

The IP tunneling controller 118 adopts or releases a tunnel at a time of transmitting a packet. For example, the IP tunneling controller 118 encapsulates the packet received by the S1 interface unit 112, and transfers the encapsulated packet to another eNB 100 via the X2 interface unit 111 by IP tunneling. Further, the IP tunneling controller 118 removes encapsulation of a packet (decapsulates a packet) transferred from another eNB 100 via the X2 interface unit 111 by IP tunneling.

The GTPU terminator 119 terminates the GTPU protocol for the packet received by the communication via the S1 interface unit 112 or that via the X2 interface unit 111. The PDCP terminator 120 terminates the PDCP protocol for the packet received by the communication via the Uu interface unit 113.

The serving GW 200 can be configured in a well-known manner as long as the serving GW 200 includes functions that can encrypt a packet using an encryption key acquired by encryption-key exchange and that can transmit the encrypted packet. Alternatively, the serving GW 200 can have a hardware configuration similar to that of the eNB 100 described above and include functional units similar to those of the eNB 100.

(2) Example of Operation

Referring to the drawings, operation performed by the mobile communication system 1 is described.

(2-1) Encryption-Key Exchange

Figure 4:
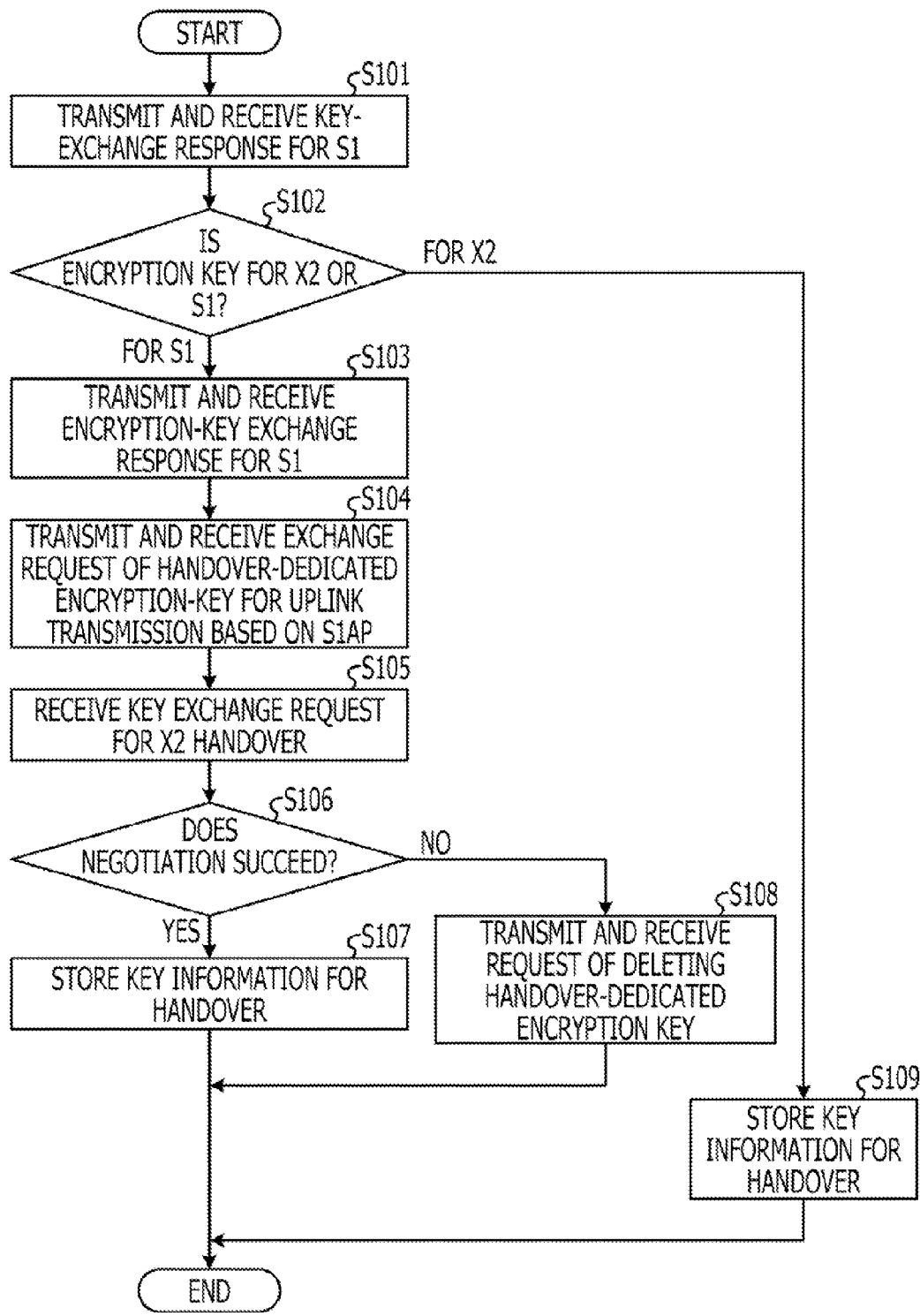
FIG. 4 is a flowchart illustrating a flow of operation performed by the radio base station in relation to encryption-key exchange.

FIG. 4 is a flowchart illustrating a flow of an encryption-key exchange operation performed by the eNB 100 included in the mobile communication system 1. Referring to FIG. 4, the encryption-key exchange operation performed by the eNB 100 is described. Note that the exchange operation described below relates to contents of exchange of encryption keys used to transmit user data before, after, and during the handover processing for a handover of the UE 300 from the eNB 100a to the eNB 100b.

The eNB 100 may start processing by receiving an encryption-key exchange request from the serving GW 200 that is the host node, another eNB 100 or the like (Step S101).

If the received encryption-key exchange request is transmitted from another eNB 100 and relates to the X2AP protocol (Step S102: For X2), the eNB 100 transmits an X2AP encryption-key exchange response to another eNB 100 and exchanges encryption keys with another eNB 100. The eNB 100 then stores the received encryption key in the SA database 106a included in the network processor memory 106 (Step S109).

If the received encryption-key exchange request is transmitted from the serving GW 200 and relates to the S1AP protocol (FIG. 4, Step S102: For S1), the eNB 100 transmits an S1AP encryption-key exchange response to the serving GW 200 (Step S103). The eNB 100 also exchanges encryption keys dedicated to a S1AP handover with the serving GW 200 (Step S104). The encryption key dedicated to the handover (hereinafter, "handover-dedicated encryption key") refers to an encryption key used for uplink transmission of user data during the processing of the handover of the UE 300 from one eNB 100 (for example, eNB 100a) to another eNB 100 (for example, eNB 100b) as described later.

Subsequently, the eNB 100 exchanges X2AP encryption keys with another eNB 100 (for example, handover-source or handover-target eNB 100) relating to the handover processing (Step S105). At this time, the eNB 100 exchanges the handover-dedicated encryption keys for uplink and exchanged with the serving GW 200, with another eNB 100 (that is, transmits the handover-dedicated encryption key for uplink to another eNB 100). As described later, the eNB 100 exchanges the handover-dedicated encryption keys upon determining whether another eNB 100 relating to the handover processing can use the handover-dedicated encryption key using a TEID.

Another eNB 100 relating to the handover processing notifies the eNB 100 of a negotiation success if another eNB 100 can use the handover-dedicated encryption key. If a negotiation for the encryption-key exchange succeeds (Step S106: Yes), the eNB 100 stores the received encryption key in the SA database 106a included in the network processor memory 106 (Step S107).

On the other hand, another eNB 100 relating to the handover processing notifies the eNB 100 of a negotiation failure if another eNB 100 cannot use the handover-dedicated encryption key. If the negotiation fails for the encryption-key exchange (Step S106: No), the eNB 100 and the serving GW 200 transmit notifications of requests of deleting the handover-dedicated encryption key and those of deletion in response to the requests to each other (Step S108).

Figure 5:
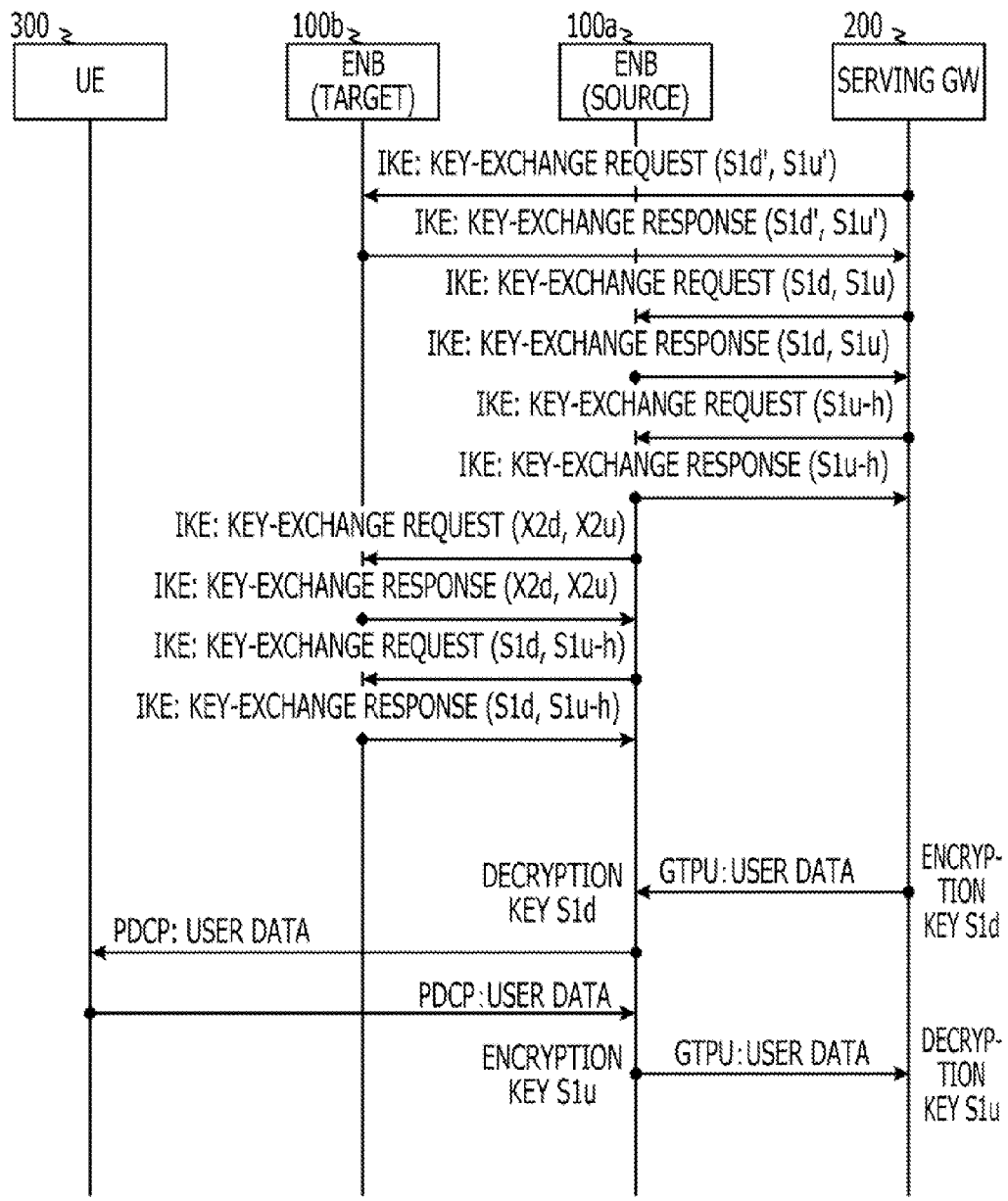
FIG. 5 is a sequence diagram illustrating a flow of encryption-key exchange processing in the mobile communication system.

FIG. 5 is a sequence diagram illustrating a flow of a encryption-key exchange operation performed by components of the mobile communication system 1. Referring to FIG. 5, the encryption-key exchange operation is described specifically.

As illustrated in FIG. 5, each of the eNB 100a and eNB 100b exchanges encryption keys with the serving GW 200 in the encryption-key exchange operation.

Specifically, the serving GW 200 exchanges S1AP encryption keys with the handover-target eNB 100b on the basis of the IKE protocol. At this time, the serving GW 200 generates an encryption key $S1d'$ for downlink and an encryption key $S1u'$ for uplink and transmits the generated encryption keys $S1d'$ and $S1u'$ to the eNB 100b, thereby negotiating the encryption-key exchange with the eNB 100b. The eNB 100b transmits a key exchange response for notifying the serving GW 200 of a negotiation success for the encryption-key exchange to the serving GW 200 if agreeing to the negotiation of exchange of the encryption keys $S1d'$ and $S1u'$.

Furthermore, the serving GW 200 exchanges S1AP encryption keys with the handover-source eNB 100a on the basis of the IKE protocol. At this time, the serving GW 200 generates an encryption key $S1d$ for downlink and an encryption key $S1u$ for uplink and transmits the generated encryption keys $S1d$ and $S1u$ to the eNB 100a, thereby negotiating the encryption-key exchange with the eNB 100a. The eNB 100a transmits a key exchange response for notifying the serving GW 200 of a negotiation success for the encryption-key exchange to the serving GW 200 if agreeing to the negotiation of exchange of the encryption keys $S1d$ and $S1u$.

Moreover, the serving GW 200 exchanges S1AP handover-dedicated encryption keys with the handover-source eNB 100a on the basis of the IKE protocol. At this time, the serving GW 200 generates a handover-dedicated encryption key $S1u$-$h$ for uplink and transmits the generated encryption key $S1u$-$h$ to the eNB 100a, thereby negotiating the encryption-key exchange with the eNB 100a. The eNB 100a transmits a key exchange response for notifying the serving GW 200 of a negotiation success for the encryption-key exchange to the serving GW 200 if agreeing to the negotiation of exchange of the encryption key $S1u$-$h$. Note that the handover-dedicated encryption key $S1u$-$h$ is the encryption key used to communicate the user data with the UE 300 during the handover between the eNB 100a and the eNB 100b. For example, the same encryption key as the S1AP encryption key $S1u$ for the communication between the eNB 100a and the serving GW 200 can be used as the handover-dedicated encryption key $S1u$-$h$.

Simultaneously with or before or after exchange of the encryption keys with the serving GW 200, the eNB 100a and eNB 100b exchange encryption keys to be used for a mutual communication.

Specifically, the eNB 100a exchanges X2AP encryption keys with the eNB 100b on the basis of the IKE protocol. At this time, the eNB 100a generates, for example, an encryption key $X2d$ for downlink and an encryption key $X2u$ for uplink and transmits the generated encryption keys $X2d$ and $X2u$ to the eNB 100b, thereby negotiating encryption-key exchange with the eNB 100b. The eNB 100b transmits a key exchange response for notifying the eNB 100a of a negotiation success for the encryption-key exchange to the eNB 100a if agreeing to the negotiation for exchange of the encryption keys $X2d$ and $X2u$.

Furthermore, the eNB 100a transmits the handover-dedicated encryption key $S1u$-$h$ for uplink and exchanged with the serving GW 200 to the eNB 100*b*, thereby negotiating encryption-key exchange with the eNB 100*b*. At this time, the eNB 100*a* confirms whether the eNB 100*b* serving as a negotiation partner can use the handover-dedicated encryption key S1*u-h*. Specifically, the eNB 100*a* confirms whether the eNB 100*b* can use the handover-dedicated encryption key S1*u-h* by using a TEID in the IKE protocol. The eNB 100*b* transmits a key exchange response for notifying the eNB 100*a* that the eNB 100*b* can conduct a negotiation for exchange of the handover-dedicated encryption key S1*u-h* to the eNB 100*a* if the eNB 100*b* can use the handover-dedicated encryption key S1*u-h*.

If the negotiation of the encryption-key exchange succeeds and the encryption-key exchange succeeds, the eNB 100*a*, the eNB 100*b*, and the serving GW 200 register the encryption keys in the respective databases.

It is preferable that the encryption-key exchange operation described above is performed at timings other than a timing of the handover processing in view of the fact that it is difficult for the eNB 100 to predict occurrence of the handover processing. It is also difficult to designate the eNBs 100 (such as the eNB 100*b*) serving as handover-target radio base stations. Therefore, it is preferable that the eNB 100 performing the encryption-key exchange operation executes the encryption-key exchange to all neighboring eNBs 100 with which the UE 300 possibly communicate and with which the handover of the UE 300 is possibly performed.

(2-2) User Data Processing before Handover Processing

After the exchange of the encryption keys, the UE 300 communicating with the eNB 100*a* (that is, the UE 300 before the handover processing) communicates with the core network via the eNB 100*a*. Specifically, the serving GW 200 transmits the user data in downlink for the UE 300, which data is encrypted with the encryption key S1*d*, to the eNB 100*a* on the basis of the GTPU protocol. After receiving the encrypted user data, the eNB 100*a* decrypts the user data with the encryption key S1*d* and transmits the decrypted user data to the UE 300 on the basis of the PDCP protocol. On the other hand, the UE 300 transmits the user data in uplink for the core network to the eNB 100*a* on the basis of the PDCP protocol. After receiving the user data, the eNB 100*a* encrypts the user data with the encryption key S1*u* and transmits the encrypted user data to the serving GW 200 on the basis of the GTPU protocol. After receiving the encrypted user data, the serving GW 200 decrypts the user data with the encryption key S1*u*.

(2-3) User Data Processing during Handover Processing

Figure 6:
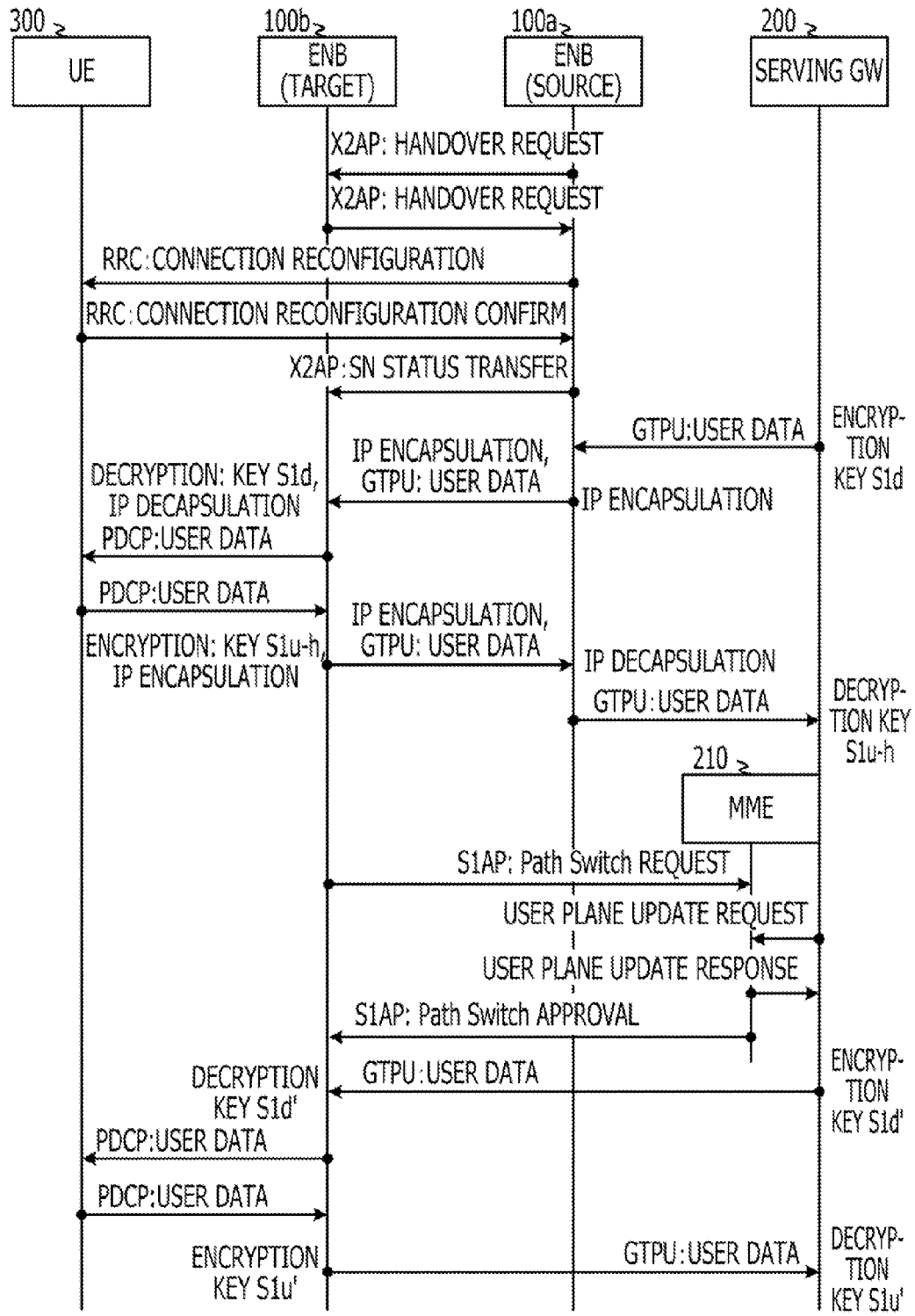
FIG. 6 is a sequence diagram illustrating a flow of handover processing in the mobile communication system.

A state of processing of the user data during the handover processing for changing a communication partner of the UE 300 from the eNB 100*a* to the eNB 100*b* is described with reference to FIG. 6. FIG. 6 is a sequence diagram illustrating a flow of user data process operations during the handover by components of the mobile communication system 1.

The handover processing starts by, for example, transmission of a handover request from the eNB 100*a* to the eNB 100*b*. If the UE 300 relating to the handover request is acceptable, the eNB 100*b* notifies the eNB 100*a* that the UE 300 is acceptable, thereby requesting execution of the handover processing.

The eNB 100*a* transmits a Connection Reconfiguration message for indicating reconfiguration of connection to the UE 300 for which the handover processing is performed based on the RRC (Radio Resource Control) protocol. The UE 300 reconfigures the connection in response to the message and notifies the eNB 100*a* of an end of the reconfiguration by transmitting a Connection Reconfiguration Confirm message to the eNB 100*a*. Thereafter, the eNB 100*a* transmits a Status Transfer message to the eNB 100*b*. As a result of a series of operations, the eNB 100*a* and eNB 100*b* turn into a state of performing the handover processing.

Figure 7:
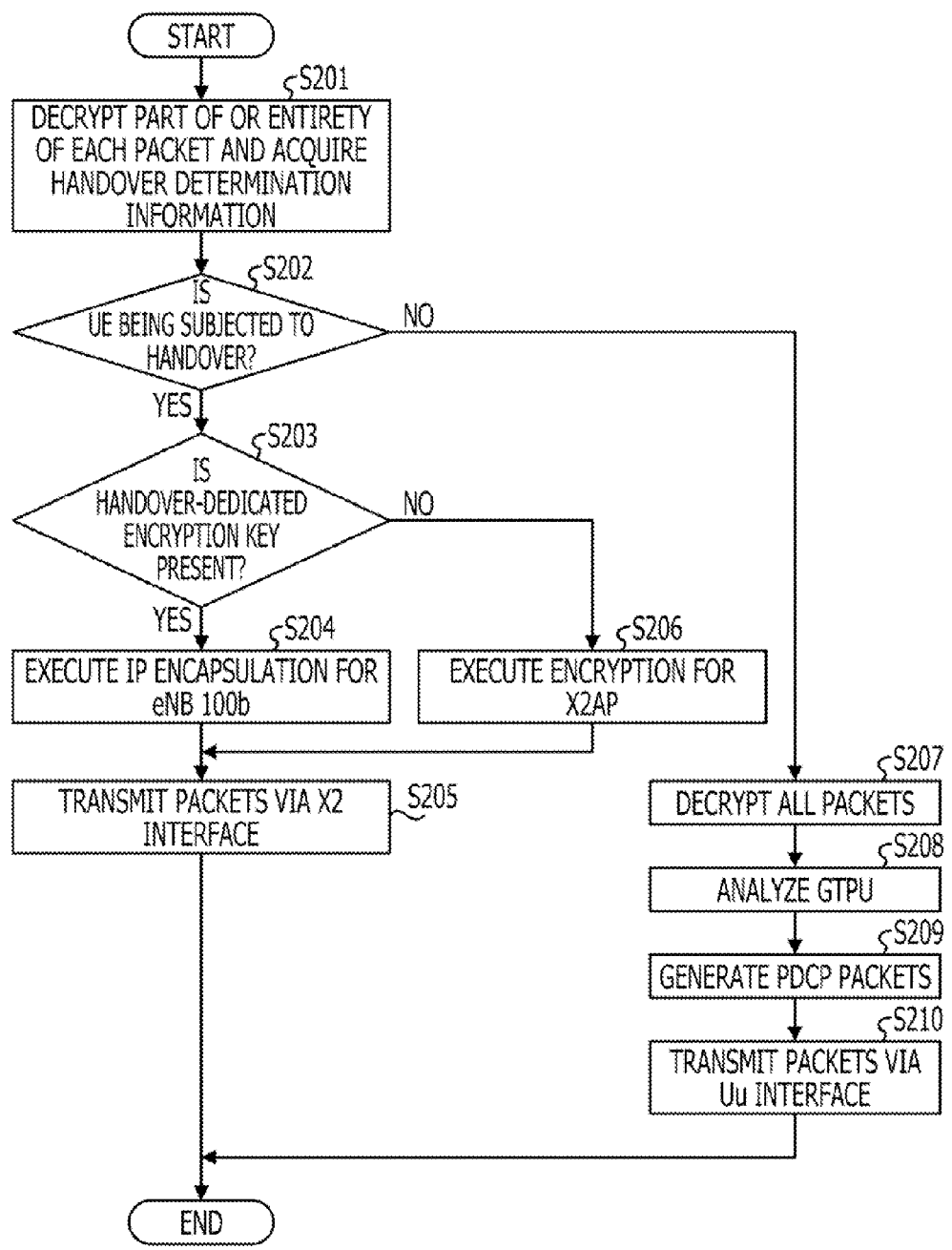
FIG. 7 is a flowchart illustrating a flow of operation performed by the radio base station in relation to packet processing via S1AP.

FIG. 7 illustrates a flow of operations performed by the eNB 100*a* if the eNB 100*a* receives the user data from the serving GW 200.

As illustrated in FIG. 7, the eNB 100*a* that receives the user data in downlink from the serving GW 200 decrypts a part or an entirety of each received packet with the encryption key S1*d*, thereby acquiring an IP address and a TEID (FIG. 7, Step S201). Specifically, the handover determination unit 117 of the eNB 100*a* decrypts each packet in the downlink transmitted from the serving GW 200 and received by the S1 interface unit 111 either partially or entirely, and acquires the IP address of the destination UE 300 and the TEID for the encryption secure communication. The handover determination unit 117 checks the acquired IP address and TEID, thereby determining whether the UE 300 is the mobile terminal for which the handover processing is performed. At this time, if the handover determination unit 117 determines that the IP address and the TEID are included in the control signal part of the encrypted packet on the basis of information or the like included in non-encrypted parts such as a header of the encrypted packet, the handover determination unit 117 acquires the IP address and the TEID by decrypting the control signal part. If the handover determination unit 177 determines that the IP address and the TEID are included in the other part of the encrypted packet or cannot determine in which part the IP address and the TEID are included, the handover determination unit 177 may entirely decrypt the encrypted packet. By referring to information stored, for example, in the handover information database 106*b* on the basis of the IP address and TEID, the eNB 100*a* determines whether the UE 300 to which the user data is to be transmitted is being subjected to the handover processing (FIG. 7, Step S202).

If the UE 300 to which the packets of the user data are to be transmitted is being subjected to the handover process (FIG. 7, Step S202: Yes), the eNB 100*a* refers to the encryption keys stored in the SA database 106*a* and confirms whether the handover-dedicated encryption key S1*u-h* is present therein (FIG. 7, Step S203).

If the handover-dedicated encryption key S1*u-h* is present (FIG. 7, Step S203: Yes), the eNB 100*a* adds an IP header for encapsulation and indicating that the handover-target eNB 100*b* is a destination to each packet and encapsulates the packet (FIG. 7, Step S204). Thereafter, the eNB 100*a* transmits the encapsulated packets to the eNB 100*b* on the basis of the X2AP (FIG. 7, Step S205).

If the handover-dedicated encryption key S1*h-u* is not present (FIG. 7, Step S203: No), the eNB 100*a* encrypts each of the packets with the X2AP encryption key X2*d* received from the eNB 100*b* (FIG. 7, Step S206). The eNB 100*a* transmits the encrypted packets to the eNB 100*b* on the basis of the X2AP (FIG. 7, Step S205).

Referring back to FIG. 6, the state of the user data processing during the handover is described again. The eNB 100*b* that receives the encapsulated packets from the eNB 100*a* performs user data processing.

Figure 8:
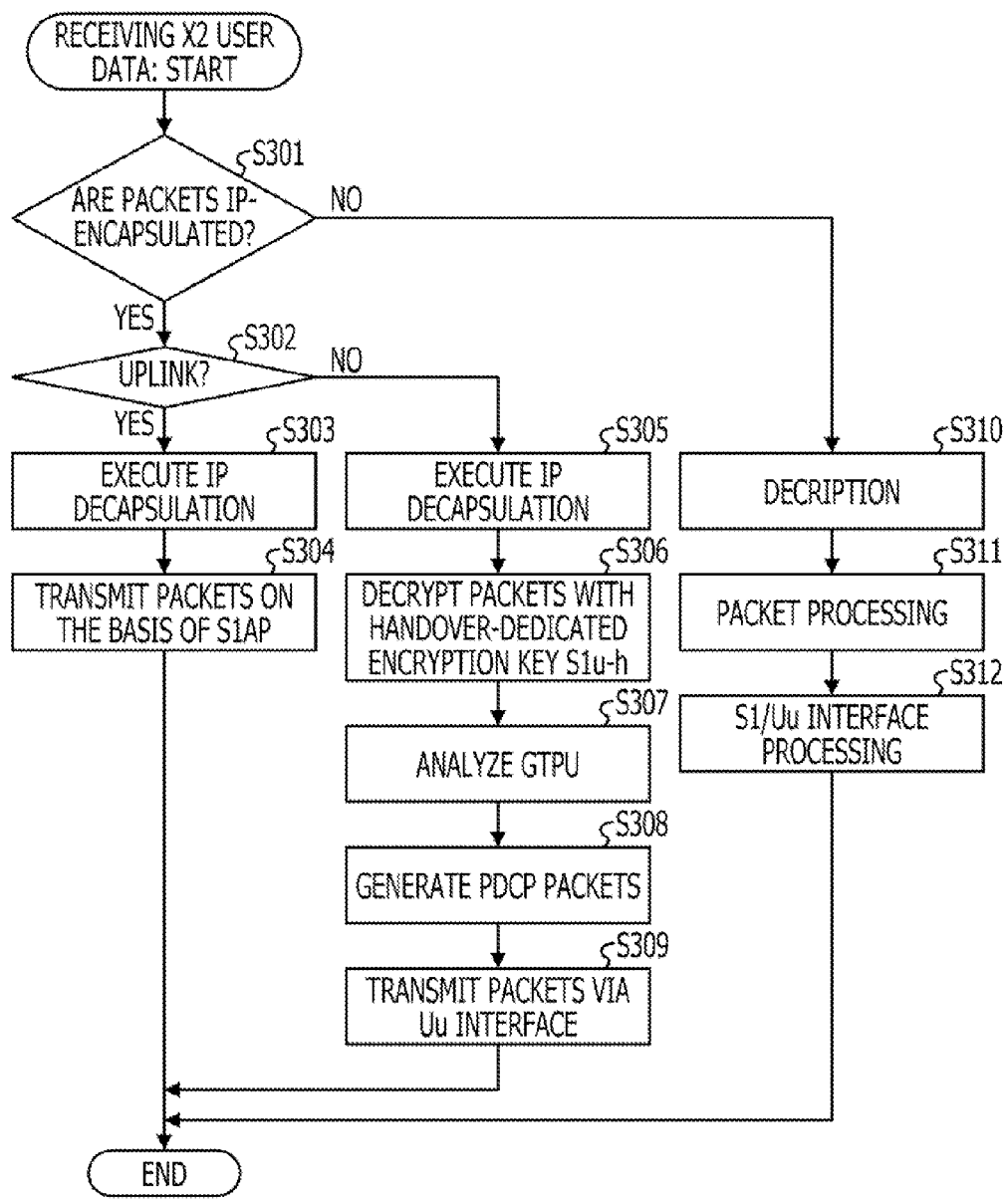
FIG. 8 is a flowchart illustrating a flow of operation performed by the radio base station in relation to packet processing via X2AP.

FIG. 8 illustrates a flow of operation performed by the eNB 100 that receives the user data on the basis of the X2AP. Referring to FIG. 8, the operation performed by the eNB 100*b* that receives the user data from the eNB 100*a* on the basis of the X2AP is described.

As illustrated in FIG. 8, at a time of receiving the user data, if the packets are encapsulated (FIG. 8, Step S301: Yes) and the user data is for downlink (FIG. 8, Step S302: No), the eNB 100*b* decapsulates the packets of the received user data (FIG.

8, Step S305). The eNB 100*b* may decrypt each of the encrypted packets with the handover-dedicated encryption key S1*u-h* (FIG. 8, Step S306). The eNB 100*b* analyzes the GTPU protocol for the decrypted packets (FIG. 8, Step S307) and generates PDCP packets (FIG. 8, Step S308). Thereafter, the eNB 100*b* transmits the PDCP packets to the UE 300 (FIG. 8, Step S309).

If the received packets are not encapsulated (FIG. 8, Step S301: No), the eNB 100*b* decrypts the received encrypted packets (FIG. 8, Step S310). The eNB 100*b* then performs the packet processing on the decrypted packets (FIG. 8, Step S311), and transmits the resultant packets to the destination via either the S1AP or Uu interface depending on the destination (FIG. 8, Step S312).

Referring back to FIG. 6, if the user data in uplink from the UE 300 is to be transmitted to the serving GW 200, the UE 300 transmits PDCP-protocol packets to the handover-target eNB 100*b*. The eNB 100*b* converts the PDCP protocol for the received packets to the GTPU protocol. The eNB 100*b* also determines whether the UE 300 relating to the packets are being subjected to the handover processing based on the IP address and TEID included in the control information part of each packet.

If the UE 300 serving as a source of the packets is being subjected to the handover processing, the eNB 100*b* converts the IP header of each packet from the serving GW 200 to the eNB 100*a* and encrypts the packet with the handover-dedicated encryption key S1*u-h*. Furthermore, the eNB 100*b* adds an IP header for encapsulation and indicating that the handover-source eNB 100*a* is a destination to each packet and encapsulates the packet. The eNB 100*b* transfers the encapsulated packets to the eNB 100*a* on the basis of the X2AP.

Referring to FIG. 8, the operation performed by the eNB 100*a* that receives the user data from the eNB 100*b* on the basis of the X2AP is described.

As illustrated in FIG. 8, at a time of receiving the user data, if the packets of the user data are encapsulated (FIG. 8, Step S301: Yes) and the user data is for uplink (FIG. 8, Step S302: Yes), the eNB 100*a* decapsulates the packets of the received user data (FIG. 8, Step S303). The eNB 100*a* then transmits the packets to the serving GW 200 on the basis of the S1AP (FIG. 8, Step S304).

Referring back to FIG. 6, after the end of the handover processing, the handover-target eNB 100*b* transmits a User Plane Update Request for requesting to update position information on the UE 300 to the MME 210. The MME 210 transmits a User Plane Update Response to the eNB 100*b* after updating the position information on the UE 300.

(2-4) User Data Processing after Handover Processing

After end of the handover processing stated above, the UE 300 communicating with the eNB 100*b* (that is, the UE 300 after the handover processing) communicates with the core network via the eNB 100*b*. Specifically, the serving GW 200 transmits the user data in downlink for the UE 300, which data is encrypted with the encryption key S1*d'*, to the eNB 100*b* on the basis of the GTPU protocol. After receiving the encrypted user data, the eNB 100*b* decrypts the user data with the encryption key S1*d'* and transmits the decrypted user data to the UE 300 on the basis of the PDCP protocol. On the other hand, the UE 300 transmits the user data in uplink for the core network to the eNB 100*b* on the basis of the PDCP protocol. After receiving the user data, the eNB 100*b* encrypts the user data with the encryption key S1*u'* and transmits the encrypted user data to the serving GW 200 on the basis of the GTPU protocol. After receiving the encrypted user data, the serving GW 200 decrypts the user data with the encryption key S1*u'*.

Figure 9:
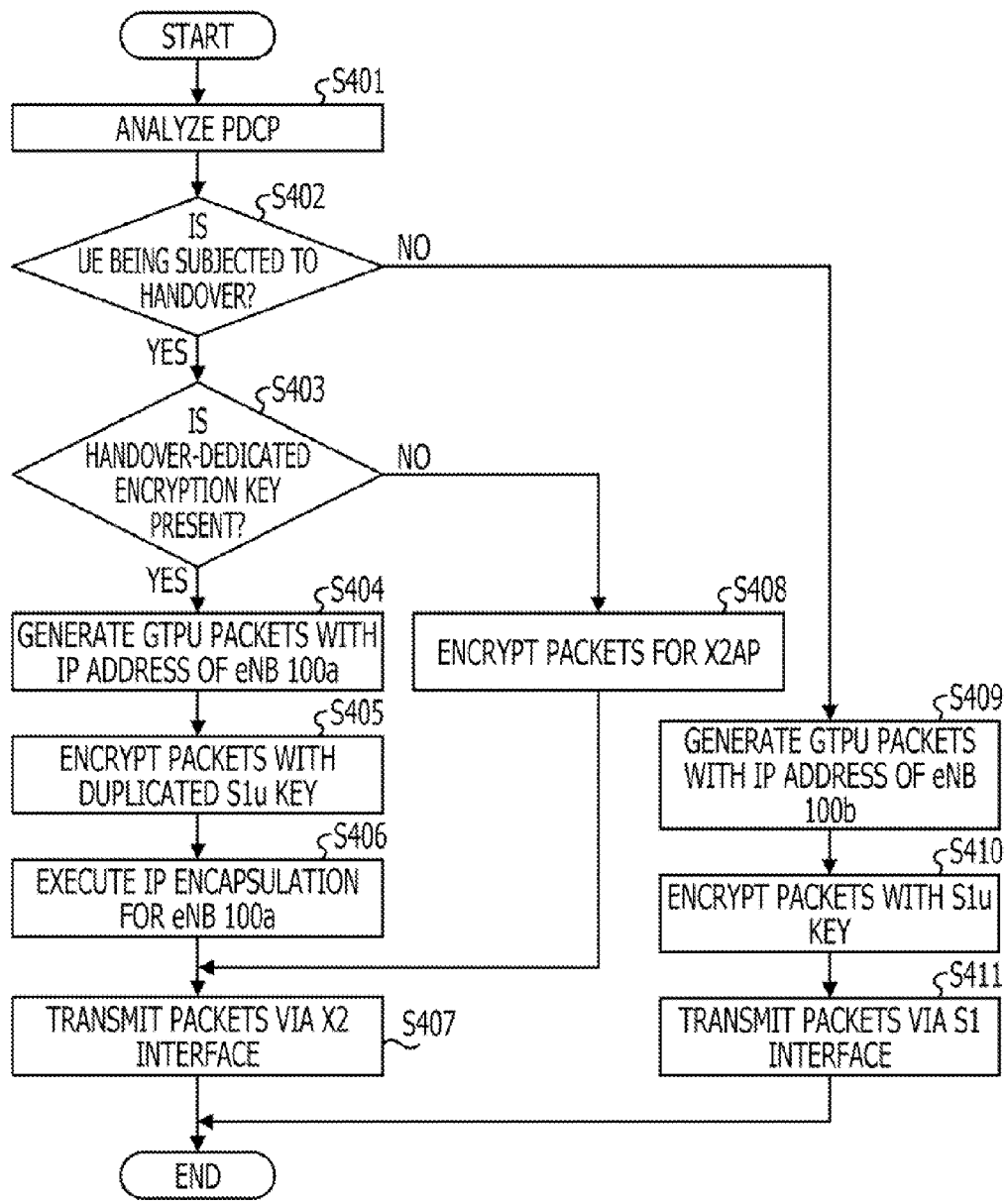
FIG. 9 is a flowchart illustrating a flow of operation performed by the radio base station in relation to packet processing via a Uu interface.

Referring to FIG. 9, operations performed by the eNB 100*b* that receives the packets in uplink from the UE 300 is described. FIG. 9 is a flowchart illustrating a flow of operation performed by the eNB 100*b* for processing the packets in uplink from the UE 300.

The eNB 100*b* that receives the packets in uplink for the core network from the UE 300 analyzes PDCP-related information in a PDCP header of each packet and determines whether the UE 300 serving as the source of the packet is being subjected to the handover processing (FIG. 9, Step S401).

If the UE 300 serving as the source of the packet is being subjected to the handover processing (FIG. 9, Step S402: Yes), the eNB 100*b* then confirms whether the handover-dedicated encryption key S1*u-h* for the handover of the UE 300 is present by referring to the encryption keys stored in the SA database 106*a* (FIG. 9, Step S403).

If the handover-dedicated encryption key S1*u-h* is present (FIG. 9, Step S403: Yes), the eNB 100*b* adds an IP header indicating that the UE300-handover-source eNB 100*a* is a source and that the serving GW 200 is a destination to each packet and generates GTPU packets (FIG. 9, Step S404). The eNB 100*b* encrypts each of the generated GTPU packets with the handover-dedicated encryption key S1*u-h* (FIG. 9, Step S405), adds an IP header indicating that the eNB 100*a* is the destination to the encrypted packet, and encapsulates the packet (FIG. 9, Step S406). Thereafter, the eNB 100*b* transmits the encapsulated and encrypted packets to the eNB 100*a* on the basis of the X2AP (FIG. 9, Step S407).

If the handover-dedicated encryption key S1*u-h* is not stored in the SA database 106*a* (Step S403: No), the eNB 100*b* encrypts each packet with the encryption key X2*u* for uplink and used for an ordinary communication with the eNB 100*a* on the basis of the X2AP (FIG. 9, Step S408). Thereafter, the eNB 100*b* transmits the encrypted packets to the eNB 100*a* on the basis of the X2AP (FIG. 9, Step S407).

If the UE 300 that is the source of the packets is not being subjected to the handover processing (FIG. 9, Step S402: No), the eNB 100*b* adds an IP header indicating that the eNB 100*b* is a source and that the serving GW 200 is a destination to each packet and generates GTPU packets (FIG. 9, Step S409). The eNB 100*b* encrypts the generated GTPU packets with the encryption key S1*u'* for uplink and received from the serving GW 200 (FIG. 9, Step S410) and transmits the encrypted GTPU packets to the serving GW 200 on the basis of the S1AP (FIG. 9, Step S411).

(3) Examples of Packets

Examples of packets used for communications in the mobile communication system 1 are described with reference to the drawings.

(3-1) Packets for Negotiation of Encryption-Key Exchange

Figure 10:
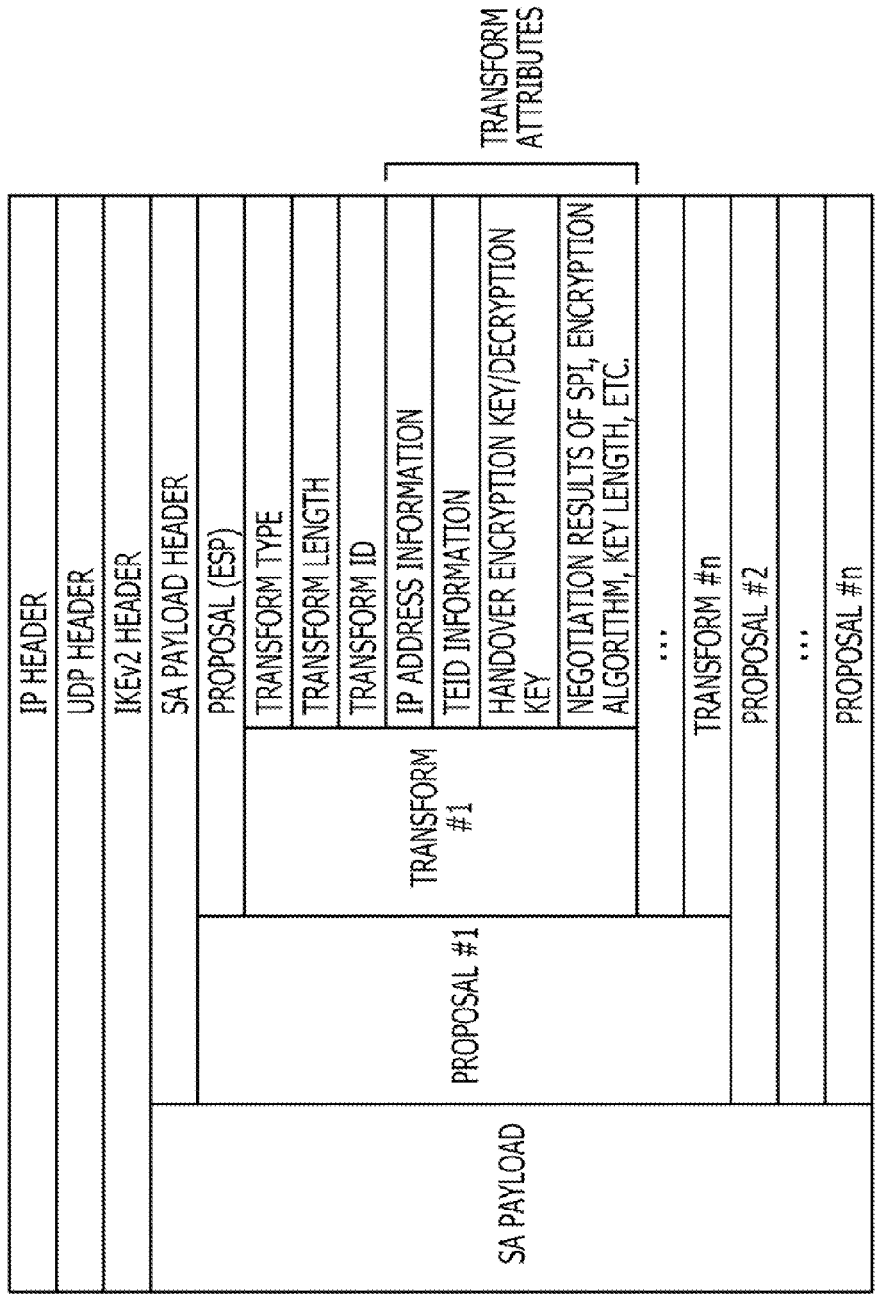
FIG. 10 illustrates an example of a packet used in the encryption-key exchange.

FIG. 10 illustrates an example of a packet transmitted or received during a negotiation of the encryption-key exchange. As illustrated in FIG. 10, the packet for the negotiation of the encryption-key exchange includes an IP header, a UDP header, an IKEv2 header, and a SA payload, for example. In the packet, the SA payload is responsible for the negotiation of encryption keys on the basis of the IKE protocol. The SA payload includes a SA payload header and one or a plurality of proposals #1 ( . . . #n). The SA payload header includes, for example, a payload number of a next payload, and a payload length indicating Reserved and an IKE version.

Each of the proposals #1 . . . #n includes a proposal header and one or a plurality of transforms #1 ( . . . #n).

Each of the transforms includes a transform type, a transform length, a transform ID, IP address information, TEID information, storage information and an encryption algorithm of the handover-dedicated encryption key, and the like. The transform type indicates a type of the transform, the transform length indicates a length of the transform, and the transform ID indicates an ID of a parameter to be used.

The eNB 100 (for example, eNB 100*a*) conducting a key exchange negotiation with another eNB 100 (for example, eNB 100*b*) for the handover-dedicated encryption key S1*u-h* confirms whether the opposing eNB 100*b* can use the handover-dedicated encryption key S1*u-h* by referring to the packet.

For example, the eNB 100*a* allocates a characteristic value indicating a negotiation relating to exchange of the handover-dedicated encryption keys S1*u-h* to each of the transform type and the transform ID. Specifically, the eNB 100*a* allocates the value indicating a notification of the encryption-key exchange negotiation relating to the handover-dedicated encryption keys S1*u-h* to the transform type. The eNB 100*a* allocates the value indicating whether a message notified by the packet is a key exchange request or a key exchange response in the negotiation for exchange of the handover-dedicated encryption keys S1*u-h* to the transform ID.

The eNB 100*b* allocates values indicating a response to the negotiation of exchange of the handover-dedicated encryption key S1*u-h* to the transform type and the transform ID, respectively and transmits the packet to the eNB 100*a* if the eNB 100*b* can use the handover-dedicated encryption key S1*u-h*. The eNB 100*a* confirms whether the eNB 100*b* can use the handover-dedicated encryption key S1*u-h* by referring to the values allocated to the transform type and the transform ID, respectively in the response from the eNB 100*b* to the key exchange request.

(3-2) Packets for Transmitting User Data

Referring to FIGS. 11 to 14, examples of packets transmitted in downlink are described.

Figure 11:
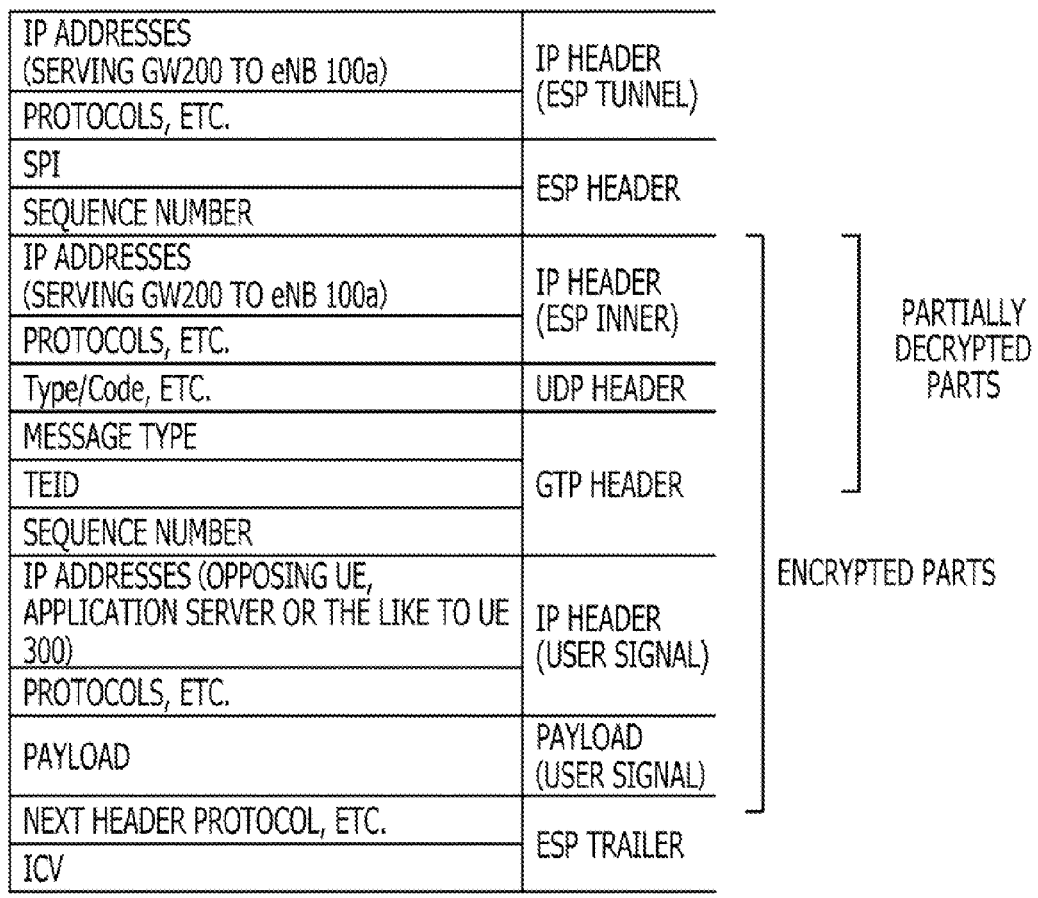
FIG. 11 illustrates an example of an encrypted packet transmitted in downlink via S1AP.

FIG. 11 illustrates an example of the packet transmitted from the serving GW 200 to the eNB 100*a* on the basis of the S1AP. As illustrated in FIG. 11, the packet includes an encryption IP header (ESP tunnel) for designating a source and a destination (the serving GW 200 to the eNB 100*a* in the example of FIG. 11) using IP addresses. An ESP header includes a Security Parameters Index (SPI) and a sequence number for identifying an SA to be used. Furthermore, encrypted parts encrypted with the encryption key include an IP header (ESP inner), a UDP header, a GTP header, an IP header (user number), a payload (user signal), and an ESP trailer. The IP header (ESP inner) includes IP addresses indicating the serving GW 200 that is the source and the eNB 100*a* that is the destination as well as protocols and the like. The UDP header includes values of a type and a code. The GTP header includes a message type and a TEID. The IP header (user signal) includes an IP address of another UE 300 or an application server or the like on the core network opposing the UE 300 that is the destination as well as a protocol and the like. The payload (user signal) includes user data to be transmitted or received. The ESP trailer includes a protocol and the like of a next header as well as an Integrity Check Value (ICV) that is not encrypted.

The IP header (ESP tunnel) includes IP addresses of the serving GW 200 that is the source and the eNB 100*a* that is the destination, respectively. The GTP header includes the TEID. The handover determination unit 117 of the eNB 100*a* that receives the packet from the serving GW 200 first partially decrypts the IP header (ESP tunnel), the UDP header, and the GTP header, and acquires the IP addresses and the TEID. The handover determination unit 117 determines whether the UE 300 that is the destination of the packet is being subjected to the handover processing based on the IP addresses and the TEID as well as information stored in the handover information database 106*b* (see Steps S201 to S202 of FIG. 7).

If encapsulating the received packet and transmitting the encapsulated packet to the eNB 100*b*, the eNB 100*a* adds an IP header (IP encapsulation) indicating that the eNB 100*b* is a destination to the packet illustrated in FIG. 11, thereby encapsulating parts of the packet other than, for example, the added IP header (IP encapsulation). Specifically, the IP header (IP encapsulation) includes IP addresses of the eNB 100*a* that is the source and the eNB 100*b* that is the destination present on both ends of the IP tunnel as well as protocols and the like. FIG. 12 illustrates an example of the packet to which the IP header is added.

The eNB 100*b* that receives the encapsulated and encrypted packet from the eNB 100*a* acquires a GTPU packet by decapsulating and decrypting the packet. FIG. 13 illustrates an example of the GTPU packet. As illustrated in FIG. 13, the GTPU packet is configured so that after removing the IP header (IP encapsulation) by decapsulation, the IP header (ESP tunnel), the ESP header, and the ESP trailer are removed by decryption from the packet illustrated in FIG. 12.

The eNB 100*b* generates a PDCP packet to be transmitted to the UE 300 from the GTPU packet. FIG. 14 illustrates an example of the PDCP packet. The PDCP packet includes a RLC header that includes information related to Radio Link Control (RLC), a PDCP header including PDCP-related information, and the IP header (user signal) and payload (user signal) illustrated in FIGS. 11 to 13.

For uplink transmission, a packet is processed and transmitted or received in a reverse order of that of the processing described above. An example of a packet transmitted in uplink is described with reference to FIGS. 15 to 18.

FIG. 15 illustrates an example of a PDCP packet transmitted from the UE 300 to the eNB 100*b* via the Uu interface unit 113. The PDCP packet transmitted from the UE 300 includes a RLC header including RLC-related information, a PDCP header including PDCP-related information, an IP header (user signal) including an IP address of the opposing UE 300 that is the source or an application server or the like on the core network as well as a protocol and the like, and a payload (user signal) where the user data to be transmitted is stored.

FIG. 16 illustrates an example of a GTPU packet generated from the PDCP packet received by the eNB 100*b*. Similarly to the GTPU packet illustrated in FIG. 13, the GTPU packet includes an IP header (ESP inner), a UDP header, a GTP header, an IP header (user signal), and a payload (user signal). The IP header (ESP inner) includes IP addresses of the eNB 100*b* that is the source and the serving GW 200 that is the destination, respectively.

FIG. 17 illustrates an example of a GTPU packet encrypted and encapsulated in the eNB 100*b*. Similarly to the encapsulated and encrypted packet 12 illustrated in FIG. 12, the GTPU packet is obtained by adding an IP header (ESP tunnel), an ESP header, and an ESP trailer to the packet illustrated in FIG. 16 as a result of encryption of the packet and by further adding an IP header (IP encapsulation) to the encrypted packet by encapsulation of the packet. In the packet illustrated in FIG. 17, the IP header (ESP tunnel) includes IP addresses indicating that the eNB 100*a* to which the packet is transferred by tunneling is the source and that the serving GW 200 is the destination, respectively. Furthermore, the IP header (IP encapsulation) includes IP addresses indicating that the eNB 100*b* is the source and that the eNB 100*a* is the destination, respectively.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A mobile communication system comprising:
    first and second radio base stations each transmitting or receiving a packet to or from each of a mobile station and a host node, wherein
    the first radio base station includes:
        a first processor which performs processes to transmit and receive a first encryption key to and from each of the host node and the second radio base station before a handover of the mobile station is performed from the first radio base station to the second radio base station, the first encryption key being used to achieve encryption secure communication among the first and second base stations and the host node independently of whether the mobile station is equipped with an encryption function or not, and
        a first interface which transmits or receives the packet to or from the second radio base station by tunneling, the packet being encapsulated;
    the second radio base station includes:
        a second interface which transmits or receives the encapsulated packet to or from the first radio base station by the tunneling, and
        a second processor which encrypts or decrypts the packet with the first encryption key;
    the host node includes a third processor which encrypts or decrypts the packet; and
    during processing of the handover of the mobile station from the first radio base station to the second radio base station,
        the host node transmits a first packet generated by encrypting a data packet with the first encryption key to the first radio base station,
        the first radio base station transmits a second packet generated by encapsulating the first packet, to the second radio base station by the tunneling so as to achieve the encryption secure communication between the first and second radio base stations, and
        the second radio base station extracts the first packet from the second packet by decapsulating the second packet, obtaining the data packet from the first packet by decrypting the first packet with the first encryption key, and then transmits the decrypted data packet to the mobile station so as to achieve encryption secure communication between the first and second radio base stations independently of whether the mobile station is equipped with an encryption function or not, wherein
        the first processor in the first radio base station duplicates the first encryption key received from the host node, and the first processor performs processes to transmit and receive the duplicated first encryption key to and from the second radio base station.

2. The mobile communication system according to claim 1, wherein
    during the processing of the handover of the mobile station from the first radio base station to the second radio base station, (i) the mobile station transmits the packet to the second radio base station, (ii) the second radio base station encrypts the packet with the first encryption key and transmits the packet to the first radio base station by the tunneling, (iii) the first radio base station decapsulates the packet and transmits the packet to the host node, and (iv) the host node decrypts the packet with the first encryption key.

3. The mobile communication system according to claim 1, wherein
    the first processor in the first radio base station performs processes to transmit and receive a second encryption key to and from the second radio base station, the second encryption key being used to achieve the encryption secure communication; and encrypts or decrypts the packet with the first encryption key and the second encryption key,
    the second processor in the second radio base station encrypts or decrypts the packet with the second encryption key, and
    (i) if the first radio base station is unable to exchange the first encryption key with the second radio base station, then the first radio base station decrypts the packet for the mobile station and transmitted from the host node with the first encryption key, encrypts the decrypted packet with the second encryption key, and transmits the packet to the second radio base station, and (ii) the second radio base station decrypts the packet with the second encryption key and transmits the packet to the mobile station.

4. The mobile communication system according to claim 3, wherein
    (i) if the second radio base station is unable to transmit or receive the first encryption key to or from the first radio base station, then the second radio base station encrypts the packet for the host node and transmitted from the mobile station with the second encryption key and then transmits the packet to the first radio base station, and (ii) the first radio base station decrypts the packet with the second encryption key, encrypts the packet with the first encryption key, and transmits the packet to the host node.

5. The mobile communication system according to claim 1, wherein
    before the handover of the mobile station is performed from the first base station to the second base station, the first encryption key used for communication between the host node and the first base station is shared between the first and second base stations; and
    during processing of the handover of the mobile station from the first base station to the second base station:
        the first base station, upon receiving a first data packet encrypted with the first encryption key from the host node, transmits the first data packet encrypted with the first encryption key to the second base station via tunneling,
        the second base station, upon receiving the first data packet encrypted with the first encryption key via tunneling from the first base station, decrypts the received first data packet with the first encryption key, and
        the second base station transmits the first data packet that is not encrypted with the first encryption key to the mobile station so as to achieve encryption secure communication between the first and second radio base stations independently of whether the mobile station is equipped with an encryption function or not.

6. The mobile communication system according to claim 5, wherein during processing of the handover of the mobile station from the first base station to the second base station:
the mobile station transmits a second data packet to the second base station;
the second base station, upon receiving the second data packet from the mobile station, encrypts the second packet with the first encryption key and transmits the second data packet encrypted with the first encryption key to the first base station via tunneling so as to achieve encryption secure communication between the first and second radio base stations independently of whether the mobile station is equipped with an encryption function or not;
the first base station, upon receiving the second data packet encrypted with the first encryption key via tunneling from the second base station, transmits the second data packet encrypted with the first encryption key to the host node; and
the host node, upon receiving the second data packet encrypted with the first encryption key from the first base station, decrypts the second data packet with the first encryption key.

7. A communication control method for a mobile communication system including first and second radio base stations each transmitting or receiving a packet to or from each of a mobile station and a host node, the communication control method comprising:
performing processes to transmit and receive a first encryption key between the first radio base station and the host node, and between the first radio base station and the second radio base station, before a handover of the mobile station is performed from the first radio base station to the second radio base station, the first encryption being used to achieve encryption secure communication among the first and second base stations and the host node independently of whether the mobile station is equipped with an encryption function or not;
transmitting or receiving the packet by tunneling between the first radio base station and the second radio base station, the packet being encapsulated; and
encrypting or decrypting the packet with the first encryption key, wherein
during processing of the handover of the mobile station from the first radio base station to the second radio base station,
(i) the host node transmits a first packet generated by encrypting the packet with the first encryption key to the first radio base station,
(ii) the first radio base station transmits a second packet generated by encapsulating the first packet, to the second radio base station by the tunneling so as to achieve the encryption secure communication between the first and second radio base stations, and
(iii) the second radio base station extracts the first packet from the second packet by decapsulating the second packet, obtains the packet from the first packet by decrypting the first packet with the first encryption key, and then transmits the packet to the mobile station so as to achieve encryption secure communication between the first and second radio base stations independently of whether the mobile station is equipped with an encryption function or not, wherein
a first processor in the first radio base station duplicates the first encryption key received from the host node, and the first processor performs processes to transmit and receive the duplicated first encryption key to and from the second radio base station.

8. The communication control method according to claim 7, wherein
during the processing of the handover of the mobile station from the first radio base station to the second radio base station, (i) the mobile station transmits the packet to the second radio base station, (ii) the second radio base station encrypts the packet with the first encryption key and transmits the packet to the first radio base station by the tunneling, (iii) the first radio base station decapsulates the packet and transmits the packet to the host node, and (iv) the host node decrypts the packet with the first encryption key.

9. A radio base station for transmitting or receiving a packet to or from each of a mobile station, a host node, and another radio base station, the radio base station comprising:
a processor which performs processes to transmit and receive an encryption key to and from each of the host node and the another radio base station before a handover of the mobile station is performed from the radio base station to the another radio base station, the encryption key being used to achieve encryption secure communication among the radio base station, the another radio base station, and the host node independently of whether the mobile station is equipped with an encryption function or not; and
an interface which transmits or receives the packet to or from the another radio base station by tunneling, the packet being encapsulated, wherein
during processing of a handover of the mobile station from the radio base station to the another radio base station, the radio base station
receives, from the host node, a first packet that is generated by encrypting the packet destined for the mobile station, with the encryption key,
transmits a second packet generated by encapsulating the first packet, to the another radio base station by the tunneling so as to achieve the encryption secure communication between the radio base station and the another radio base station, wherein
the processor duplicates the encryption key received from the host node, and the processor performs processes to transmit and receive the duplicated encryption key to and from the another radio base station.

10. A radio base station for transmitting or receiving a packet to or from each of a mobile station, a host node, and another radio base station, the radio base station comprising:
a processor which performs processes to transmit and receive an encryption key to and from each of the host node and the another radio base station before a handover of the mobile station is performed from the another radio base station to the radio base station, the encryption key being used to achieve encryption secure communication between the radio base station and the another radio base station independently of whether the mobile station is equipped with an encryption function or not; and
an interface which transmits or receives the packet to or from the another radio base, station by tunneling, the packet being encapsulated, wherein
during processing of a handover of the mobile station from the another radio base station to the radio base station, the radio base station
receives, from the another radio base station, a first packet generated by encapsulating a second packet, the second packet being generated by encrypting a data packet destined for the mobile station with the encryption key, by the tunneling so as to achieve the encryption secure communication between the radio base station and the another radio base station, extracts the second packet from the first packet by decapsulating the first packet, obtains the data packet from the second packet by decrypting the second packet with the encryption key, and transmits thedecrypted data packet to the mobile station so as to achieve encryption secure communication between the first and second radio base stations independently of whether the mobile station is equipped with an encryption function or not, wherein the processor duplicates the encryption key received from the host node, and the processor performs processes to transmit and receive the duplicated encryption key to and from the another radio base station.

11. A radio base station for transmitting or receiving a packet to or from each of a mobile station, a host node, and another radio base station, the radio base station comprising:

a processor which performs processes to transmit and receive an encryption key to and from each of the host node and the another radio base station before a handover of the mobile station is performed from the radio base station to the another radio base station, the encryption key being used to achieve encryption secure communication among the radio base station, the another radio base station, and the host node independently of whether the mobile station is equipped with an encryption function or not; and an interface which transmits or receives the packet to or from the another radio base station by tunneling, the packet being encapsulated, wherein during processing of a handover of the mobile station from the radio base station to the another radio base station, the radio base station receives, from the another radio base station, a first packet generated by encapsulating a second packet, the second packet being generated by encrypting a data packet destined for the host node with the encryption key, by the tunneling so as to achieve the encryption secure communication between the radio base station and the another radio base station, extracts the second packet from the first packet by decapsulating the first packet, obtains the data packet from the second packet by decrypting the second packet with the encryption key, and transmits the decrypted data packet to the host node so as to achieve encryption secure communication between the first and second radio base stations independently of whether the mobile station is equipped with an encryption function or not, wherein the processor duplicates the encryption key received from the host node, and the processor performs processes to transmit and receive the duplicated encryption key to and from the another radio base station.

12. A radio base station for transmitting or receiving a packet to or from each of a mobile station, a host node, and another radio base station, the radio base station comprising:

a processor which performs processes to transmit and receive an encryption key to and from each of the host node and the another radio base station before a handover of the mobile station is performed from the another radio base station to the radio base station, the encryption key being used to achieve encryption secure communication among the radio base station, the another radio base station, and the host node independently of whether the mobile station is equipped with an encryption function or not; and an interface which transmits or receives the packet to or from the another radio base station by tunneling, the packet being encapsulated, wherein during processing of a handover of the mobile station from the another radio base station to the radio base station, the radio base station receives, from the mobile station, a data packet destined for the host node, generates a first packet by encrypting the data packet with the encryption key, generates a second packet by encapsulating the first packet, and transmits the second packet to the another radio base station by the tunneling so as to achieve the encryption secure communication between the radio base station and the another radio base station independently of whether the mobile station is equipped with an encryption function or not, wherein the processor duplicates the encryption key received from the host node, and the processor performs processes to transmit and receive the duplicated encryption key to and from the another radio base station.

* * * * *